United States Patent
Maucksch

(10) Patent No.: US 7,424,390 B2
(45) Date of Patent: *Sep. 9, 2008

(54) METHOD TO EVALUATE WHETHER A TIME DELAY IS BETTER THAN A TIME LIMIT

(75) Inventor: Thomas Maucksch, Tuntenhausen (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 314 days.

This patent is subject to a terminal disclaimer.

(21) Appl. No.: 10/531,865

(22) PCT Filed: Oct. 1, 2003

(86) PCT No.: PCT/EP03/10873

§ 371 (c)(1),
(2), (4) Date: Dec. 29, 2005

(87) PCT Pub. No.: WO2004/036945

PCT Pub. Date: Apr. 29, 2004

(65) Prior Publication Data

US 2006/0247887 A1 Nov. 2, 2006

(30) Foreign Application Priority Data

Oct. 18, 2002 (EP) .................. 02023410

(51) Int. Cl.
  *G04F 13/00* (2006.01)
  *G06F 19/00* (2006.01)
  *H04B 7/216* (2006.01)
(52) U.S. Cl. .................. 702/176; 702/57; 370/335; 370/342
(58) Field of Classification Search .............. 702/57, 702/176, 89; 370/342, 335
See application file for complete search history.

(56) References Cited

U.S. PATENT DOCUMENTS 5,267,261 A    11/1993    Blakeney et al.
6,081,717 A    6/2000    Shah et al.

(Continued)

OTHER PUBLICATIONS

Dudewicz et al., Modern Mathematical Statistics, Tests of Hypotheses, pp. 514-526.

(Continued)

*Primary Examiner*—Hal D Wachsman
*Assistant Examiner*—Janet L Suglo
(74) *Attorney, Agent, or Firm*—Ditthavong Mori & Steiner, P.C.

(57) ABSTRACT

A method for testing the time delay error ratio ER of a device against a maximal allowable time delay error ratio $ER_{limit}$ with an early pass and/or early fail criterion, whereby the early pass and/or early fail criterion is allowed to be wrong only by a small probability D. ns time delays TD of the device are measured, thereby ne bad time delays of these ns time delays TD are detected. $PD_{high}$ and/or $PD_{low}$ are obtained, whereby $PD_{high}$ is the worst possible likelihood distribution and $PD_{low}$ is the best possible likelihood distribution containing the measured ne bad time delays with the probability D. The average numbers of erroneous bits $NE_{high}$ and $NE_{low}$ for $PD_{high}$ and $PD_{low}$ are obtained. $NE_{high}$ and $NE_{low}$ are compared with $NE_{limit}=ER_{limit}$ ns. If $NE_{limit}$ is higher than $NE_{high}$ or $NE_{limit}$ is lower than $NE_{low}$ the test is stopped.

23 Claims, 4 Drawing Sheets

U.S. PATENT DOCUMENTS

| | | | |
|---|---|---|---|
| 6,167,039 A * | 12/2000 | Karlsson et al. | 370/342 |
| 6,216,095 B1 * | 4/2001 | Glista | 702/117 |
| 2002/0039349 A1 * | 4/2002 | Malaney et al. | 370/230.1 |
| 2003/0014683 A1 * | 1/2003 | Deas et al. | 713/503 |
| 2004/0057404 A1 * | 3/2004 | Maucksch et al. | 370/333 |
| 2006/0002460 A1 * | 1/2006 | Maucksch et al. | 375/227 |

OTHER PUBLICATIONS

Zonoozi et al., Optimum Hysteresis Level, Signal Averaging Time and Handover Delay, Vehicular Technology Conference, AZ, USA, May 4-7, 1997, New York, NY, USA, IEEE, pp. 310-313, Sections I and IV.

* cited by examiner

ER limit = 0.2 (1/5)   Actual ER = 0.25 (1/4)

| Number of sample, | 1 | 2 | 3 | 4 | 5 | 6 | 7 | 8 | 9 | 10 etc... |
|---|---|---|---|---|---|---|---|---|---|---|
| Sequence, 0: correct, 1: error | 0 | 1 | 0 | 0 | 0 | 1 | 0 | 0 | 0 | 1 |
| ER | | 1/2 | 1/3 | 1/4 | 1/5 | 2/6 | 2/7 | 2/8 | 2/9 | 3/10 |
| ER $_{norm}$ | | 5/2 | 5/3 | 5/4 | 5/5 | 10/6 | 10/7 | 10/8 | 10/9 | 15/10 |

METHOD TO EVALUATE WHETHER A TIME DELAY IS BETTER THAN A TIME LIMIT

The invention concerns a method to evaluate whether a time delay as an implementation dependent parameter is better than a statistically defined soft time limit. The invention is especially applied to a class of measurements measuring the delay time from a cell quality swap, generated by a system simulator, to the registration message, generated by the user equipment, a mobile station for example. In a mobile communication system the mobile station (user equipment) should make a cell reselection or handover to another base station of another communication cell if the quality of communication with the current base station of the current cell (cell quality) decreases and the communication quality with an other base station of an other cell increases over the quality of the current base station.

Such a soft handover handled by a mobile station in a communication system with several base stations for a mobile system of the third generation using Code Division Multiple Access (CDMA) is known from U.S. Pat. No. 5,267,261 for example.

The communication standard defines a maximum delay time from the swap cell quality until the time where the user equipment issues a registration message in order to register to the other base station. However, this time delay TD is not defined as a hard limit, i. e. the user equipment would not fail the test if the delay time exceeds the time limit only a single time, but is defined as a soft time limit, i. e. the user equipment shall fulfil the test requirement for a certain percentage (for example 90%) of the cases in repeated measurements. The pass fail decision of the test-equipment shall be done with a certain quality, for example 3% wrong decision risk.

From the present state of the art it is not known how to deal with such statistically defined soft time limits for repeated tests.

Such a test is time consuming. This is illustrated by the following example: The success ratio SR in this example is 90%. The time limit in this example is 8 s. Due to statistical significance it is not enough to observe 9 successes in 10 measurements. For statistical significance it is usual to observe 200*9 successes in 200*10 measurements. This test lasts 4.5 hours.

It is the object of the present invention to provide an effective method to make a pass fail decision, especially on repeated time delay measurements, against a statistically defined soft time limit.

It is further the object of the present invention to provide an effective method to make the pass fail decision in the minimum possible test time preserving the statistical significance.

The object is solved alternatively by the features of claim 1, 2, 7 or 8.

The depended claims concern further developments of the invention. Claims 20 to 23 cover the respective digital storage mediums computer program and computer program product.

The invention is further described with respect to the drawings. In the drawings FIG. 1 shows the scenario of cell swap and measurement of delay time;

Figure 4:
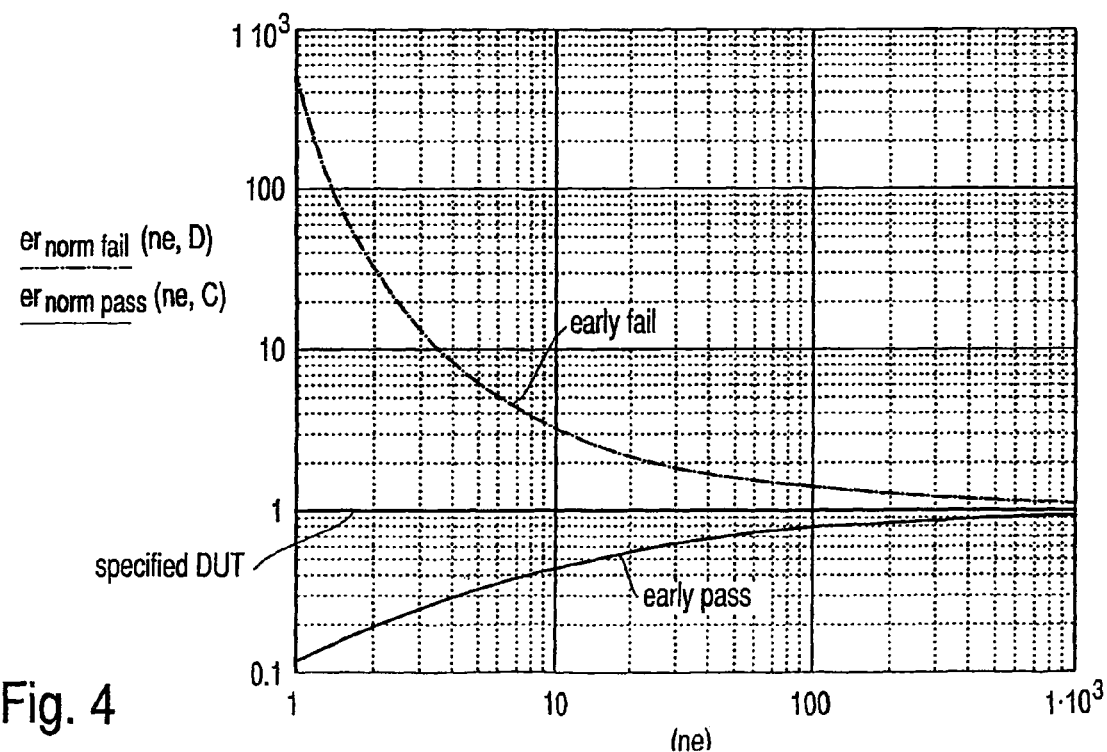
Figure 5:
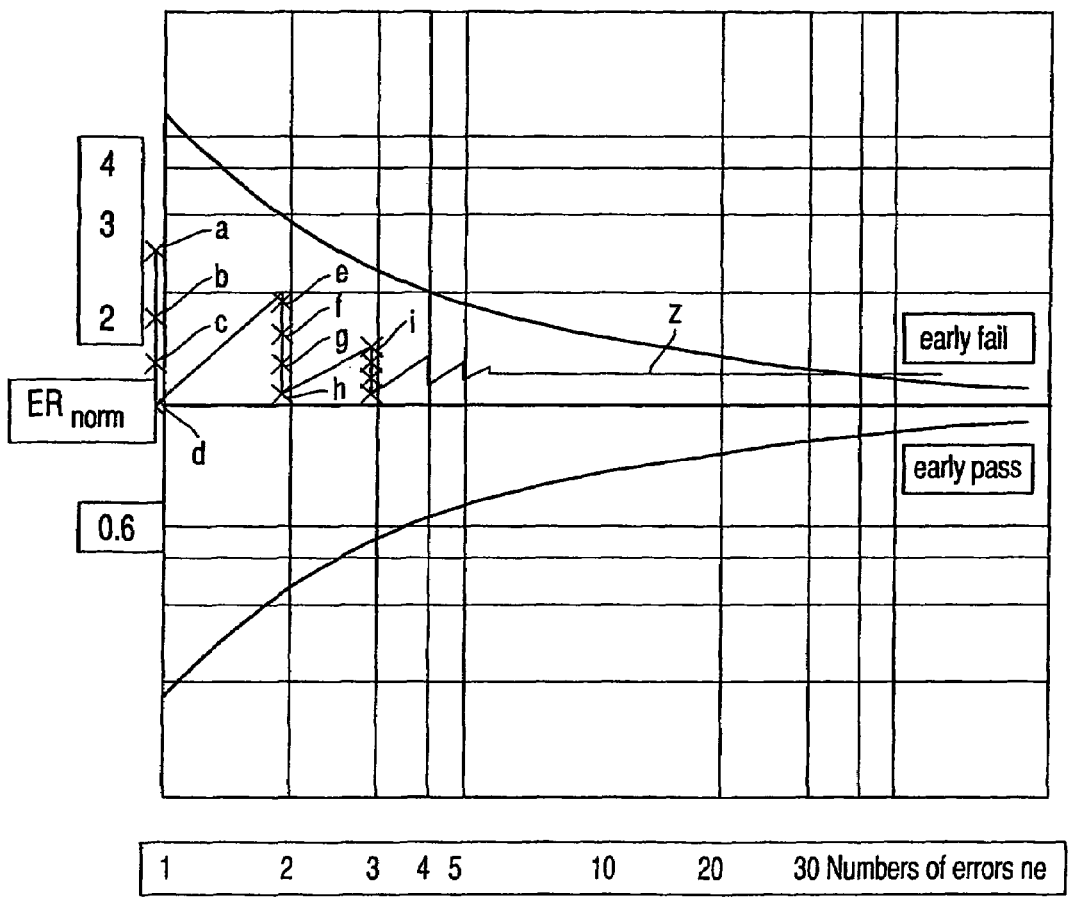
Figure 6:
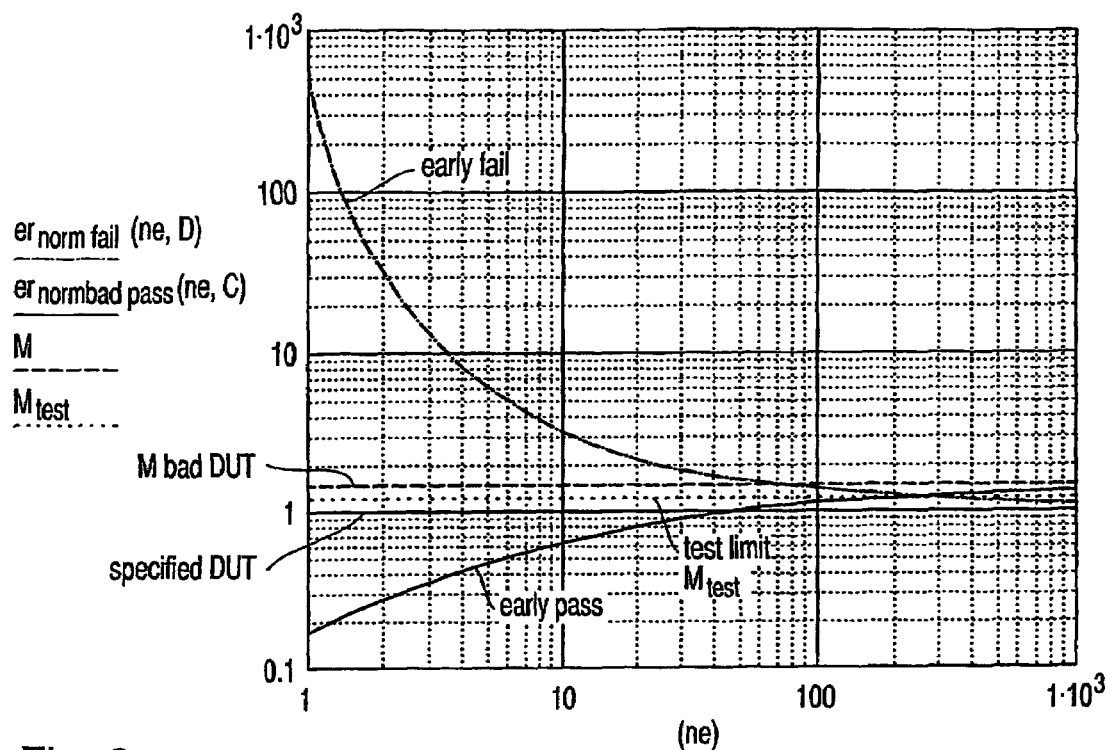
Figure 7:
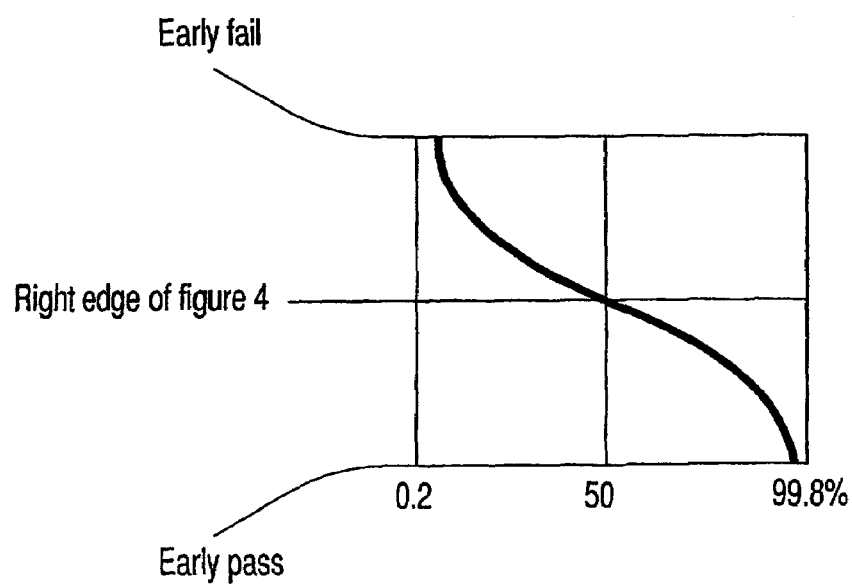

FIG. 4 shows the referenced Error Ratio $er_{norm}$ as a function of the measured errors ne, FIG. 5 shows a diagram to illustrate a measurement using a first embodiment of the inventive method, FIG. 6 shows a diagram to illustrate a measurement using a second embodiment of the inventive method and FIG. 7 shows a diagram illustrating the position at the end of the test using the first embodiment of the inventive method as a function of probability.

Figure 1:
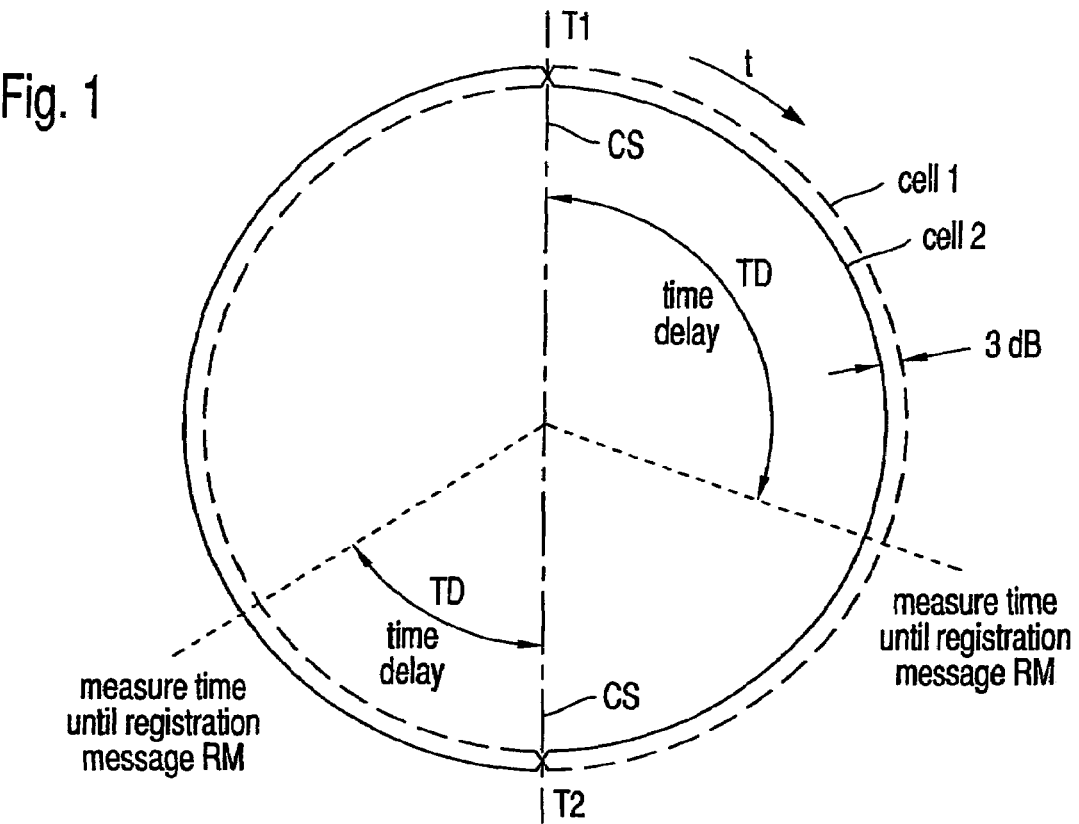
Figure 2:
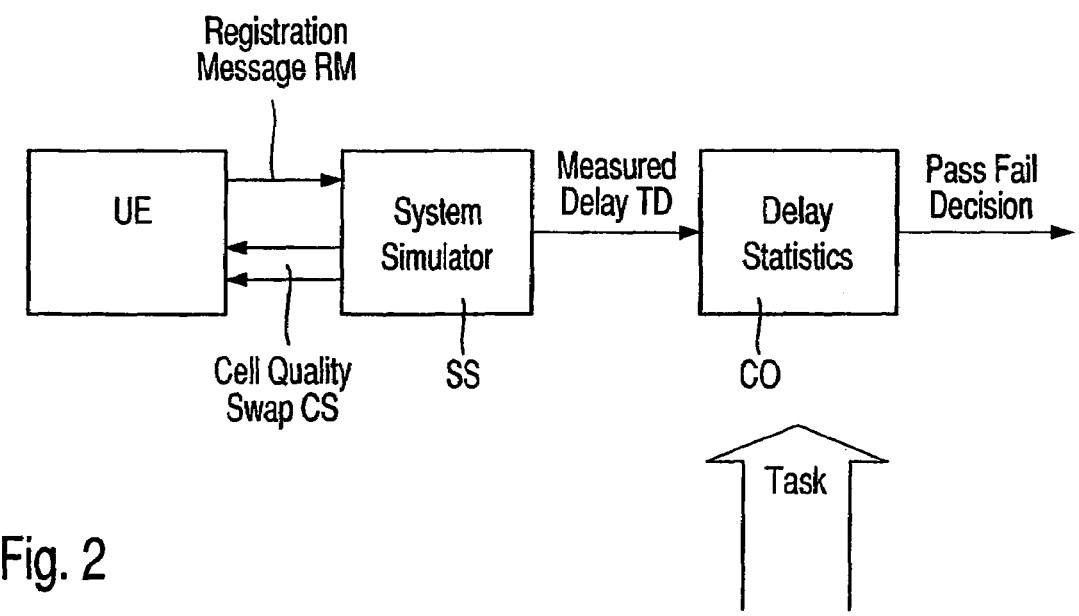
FIG. 2 shows a block diagram of the measurement set up.

FIG. 1 shows the scenario of the swap and measurement of time delay. FIG. 2 shows the respective measurement set up.

A system simulator SS simulates the two cells cell 1 and cell 2 of a cellular mobile communication system. A User Equipment UE (mobile station) is registered to one of the cells of the cellular mobile communication system. The system simulator SS swaps the cell quality at specific cyclic time points T1 and T2. From time T1 until time T2 cell 1 has the better cell quality compared to cell 2. For example the field strength received by the User Equipment UE from cell 1 is 3 dB higher than received from cell 2. From T2 to T1 the cell quality of cell 2 is better as the cell quality of cell 1. The User Equipment UE should recognise the cell swap CS and should react to the cell swap CS by issuing a registration message RM. With the registration message RM the User Equipment UE registers to the cell serving with better cell quality. The User Equipment UE needs a specific time delay TD to evaluate and recognise the cell swap CS and to react thereon with the registration message RM. This time delay TD is measured for a specific number of tests by the system simulator SS and the result is transferred to the controller CO, as shown in FIG. 2. According to the inventive method the time delays TD are measured. Each time delay TD is hard decided, if it is worse or better than the time limit. Then it is evaluated whether the delays are better than the time-limit in 90% of the cases. After sufficient repetitions an overall pass fail decision with a wrong decision risk of e.g. 3% is done in a minimum possible test time.

The following realisation is exploited:

The occurrence of the bad delay in all delays, measured, is statistically independent, or can easily made statistically independent, by inserting sufficient recovery time after a registration event. Statistically independent events are determined by the binomial distribution for any error ratio. (Error Ratio ER=1−SR Success Ratio)

For small error ratios the binomial distribution is approximated by the Poisson distribution. The use of both distributions give meaningful results: The Poisson distribution give optimal results in terms of test time and statistical significance for small error ratios, and the Poisson distribution is well supported in mathematical software tools.

For high error ratios the Poisson distribution give suboptimal results. The results are conservative in the sense: Test time is longer (worse) than optimal. Wrong decision risk is lower (better) than predefined.

The binomial distribution is optimal in terms of test time and statistical significance for any error ratio. However the binomial distribution is not so well supported in standard mathematical software tools. Both derivations are described in the following.

According to the present invention, the worst possible likelihood distribution $PD_{high}$ and/or the best possible likelihood distribution $PD_{low}$ are obtained by the formulas given in claim 1 or 2 and 7 or 8, respectively. From these likelihood distributions, the average number $NE_{high}$ or $NE_{low}$ is obtained and compared with $NE_{limit}$, respectively. If $NE_{limit}$ is higher than the average number $NE_{high}$ or smaller than the average number $NE_{low}$, the test is stopped and it is decided that the device has early passed or early failed, respectively. During the test a single step wrong decision probability for a preliminary ER stage can be used, which is smaller than the probability for the entire test.

The Poisson distribution preferably used for the present invention, is best adapted to a small number of "bad delay times". A "bad delay time" is defined as a delay time, exceeding the time limit. For example a measured time delay exceeding the time limit of 8 s would be a "bad time delay", also referred to as an "error". A measured time delay TD below the time limit, of for example 8 s, would be a "good time delay".

In the following, a test procedure together with the early fail condition and the early pass condition is derived with mathematical methods.

The ER test procedure is an iterative process: The number ns of delays TD and the number of errors ne are accumulated from the beginning of the test to calculate a preliminary ER (Error Ratio). Time delays TD up to the next error are used together with the past time delays TD to calculate the next preliminary ER. Every preliminary ER is tested against an early pass or early fail bound. The formulas to derive an early pass or early fail condition contain a single step wrong decision probability D. This is valid only for one specific preliminary ER stage. However, it is meaningful to have a wrong decision probability F for the entire test (F>D). The application proposes to use a single step wrong decision probability D, which is smaller than the probability for the entire test and proposes a method to derive D from a given F.

Due to the nature of the test, namely discrete error events, the early stop conditions are declared not valid, when a fractional number of bad time delays<1 are used to calculate the early stop limits. The application contains proposals, how to conduct the test at this undefined areas. The proposals are conservative (not risky). A DUT on the ER-limit does not achieve any early stop condition. The application proposes to stop the test unconditioned at a specific number K (for example 200) bad time delays. As this proposal contains different measurement qualities, an additional proposal is made to overcome this drawback.

Based on a measurement at a preliminary ER stage pERs, a confidence range CR around this measurement is derived. It has the property that with high probability the real result can be found in this range.

The confidence range CR is compared with the specified ER limit. From the result a diagram is derived containing the early fail and the early pass condition.

With a finite number of delays ns, the final Error Ratio ER cannot be determined exactly. Applying a finite number of delays ns, a number of bad time delays ne is measured. ne/ns=er is the preliminary Error Ratio.

In a test at a preliminary ER stage pERs a finite number ns of measured time delays TD is applied, and a number of bad time delays ne is measured. ne is connected with a certain differential probability in the Poisson distribution. The probability and the position in the distribution conducting just one test at a preliminary ER stage pERs is not known.

Repeating this test infinite times, applying repeatedly the same ns, the complete Poisson distribution is obtained. The average number (mean value) of bad time delays is NE. NE/ns is the real ER at the DUT. The Poisson distribution has the variable ne and is characterised by the parameter NE, the average or mean value. Real probabilities to find ne between two limits are calculated by integrating between such limits. The width of the Poisson distribution increases proportional to SQR(NE), that means, it increases absolutely, but decreases relatively.

In a test at a preliminary ER stage pERs ns time delays TD are applied and ne bad time delays are measured. The result can be a member of different Poisson distributions each characterized by another parameter NE. Two of them are given as follows:

The worst possible distribution $NE_{high}$, containing the measured ne with the probability $D_1$, is given by the inverse cumulative operation $$D_1 = \int_0^{ne} PD_{high}(ni, NE_{high}) \, dni \quad (1)$$

In the example $D_1$ is 0.002=0.2% $PD_{high}$ is the wanted Poisson distribution with the variable ni. ne is the measured number of bad time delays.

The best possible distributions $NE_{low}$, containing the measured ne with the probability $D_2$ is given by the inverse cumulative operation $$D_2 = \int_{ne}^{\infty} PD_{low}(ni, NE_{low}) \, dni \quad (2)$$

In the example $D_2$ is equal $D_1$ and it is $D=D_1=D_2=0.002=0.2\%$.

Figure 3:
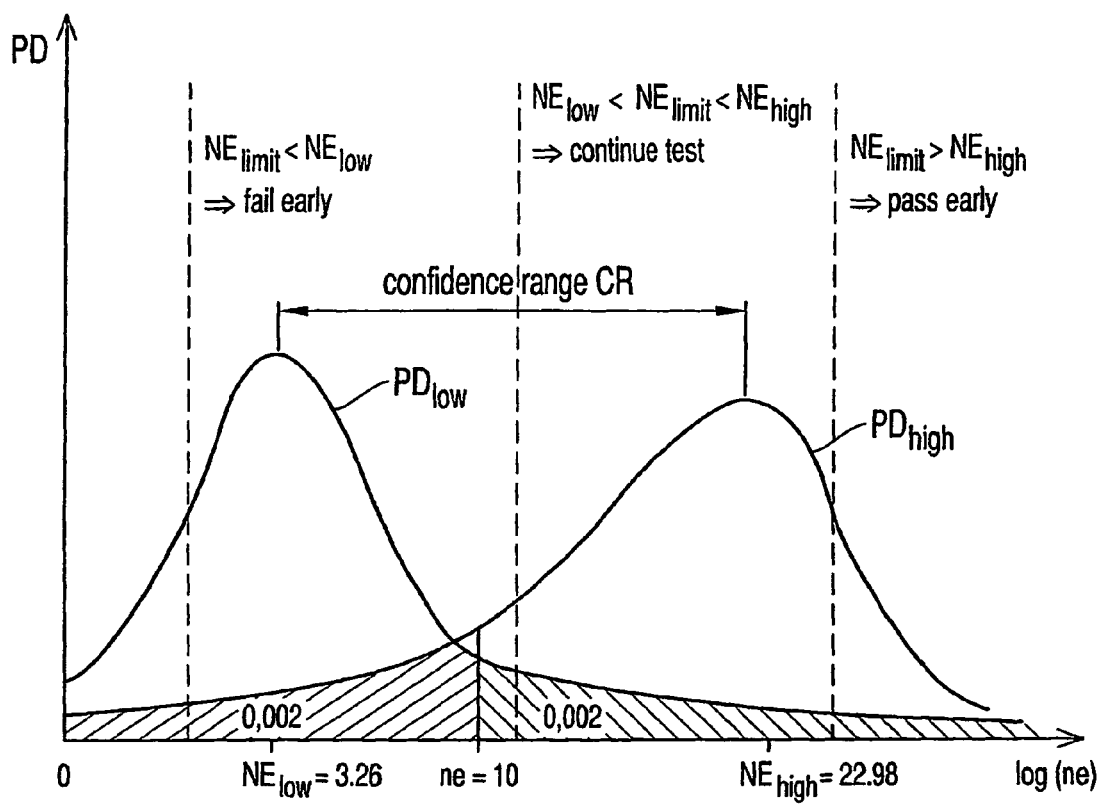
FIG. 3 shows a diagram to illustrate the inventive method.

To illustrate the meaning of the range between $NE_{low}$ and $NE_{high}$ refer to FIG. 3. FIG. 3 shows the likelihood density PD as a function of the measured number of bad time delays ne. In the example, the actual detected number of bad time delays ne within the measured number ns of time delays TD is 10. The likelihood distribution of the bad time delays is not known. The worst possible likelihood distribution $PD_{high}$ under all possible likelihood distributions as well as the best possible likelihood distribution $PD_{low}$ under all possible likelihood distributions are shown. The worst possible likelihood distribution $PD_{high}$ is characterized in that the integral from 0 to ne=10 gives a total probability of $D_1$=0.002. The best possible likelihood distribution $PD_{low}$ is characterized in that the integral from ne=10 to ∞ gives a total probability of $D_2$=0.002. In the preferred embodiment $D_1$ is equal to $D_2$, i.e. $D_1=D_2=0.002=0.2\%$. After having obtained the likelihood distribution $PD_{high}$ and $PD_{low}$ from formulas (1) and (2), the average values or mean values $NE_{high}$ for the likelihood distribution $PD_{high}$ and $NE_{low}$ for the likelihood distribution $PD_{low}$ can be obtained. The range between the mean values $NE_{low}$ and $NE_{high}$ is the confidence range CR indicated in FIG. 3.

In the case the measured value ne is a rather untypical result (in the example just 0.2% probability) nevertheless the real result NE can still be found in this range, called confidence range CR.

The probabilities $D_1$ and $D_2$ in (1) and (2) can be independent, but preferable they are dependent and equal ($D=D_1=D_2$).

For the Poisson distribution $NE_{low}$ and $NE_{high}$ are the result of the inverse cumulative operations above and are shown in formulas (3) and (4) respectively. The inputs are the number of bad time delays ne, measured in this test, and the probabilities D and C=1−D. The Output is NE, the parameter describing the average of the Poisson distribution.

The following example is illustrated in FIG. 3 ($D=D_1=D_2$):

$$NE_{low} = \frac{qchisq(D, 2 \cdot ne)}{2} \quad (3)$$

$$NE_{high} = \frac{qchisq(C, 2 \cdot ne)}{2} \quad (4)$$

Example:
  Number of bad time delays: ne=10
  Probability: D=0.002 C=0.998

Result:
  $NE_{low}$=3.26
  $NE_{high}$=22.98

Interpretation:

Having measured ne=10 bad time delays in a test with preliminary ER stage pERs, then at a low probability D=0.002 the average number of bad time delays NE in this test is outside the range from 3.26 to 22.98 or with a high probability C=0.998 inside this range from 3.26 to 22.98.

Such as the width of the Poisson distribution, the confidence range CR increases proportional to SQR(ne), that means, it increases absolutely, but decreases relatively.

If the entire confidence range CR, calculated from a single result ne, is found on the good side ($NE_{limit} > NE_{high}$) of the specified $NE_{limit}$ we can state: With high probability C, the final result NE is better than $NE_{limit}$. Whereby $NE_{limit}$ is given by $$NE_{limit} = ER_{limit} \cdot ns \quad (5)$$

and $ER_{limit}$ is the Error Ratio allowable for the device and obtained by an ideal long test with an infinite high number ns of time delays TD.

If the entire confidence range CR, calculated from a single result ne, is found on the bad side ($NE_{limit} < NE_{low}$) of the specified $NE_{limit}$ we can state: With high probability C, the final result NE is worse than the ER-limit.

With each new time delay TD a new test is considered, reusing all former results. With each new test the preliminary data for ns, ne and er is updated. For each new test the confidence range CR is calculated and checked against $NE_{limit}$.

Once the entire confidence range CR is found on the good side of the specified limit ($NE_{limit} > NE_{high}$), an early pass is allowed. Once the entire confidence range CR is found on the bad side of the specified limit ($NE_{limit} < NE_{low}$) an early fail is allowed. If the confidence range CR is found on both sides of the specified limit ($NE_{low} < NE_{limit} < NE_{high}$), it is evident neither to pass nor to fail the DUT early.

FIG. 3 illustrates the above conditions. Of course, $NE_{limit}$ is a fixed value not altering during the test, but $NE_{low}$ and $NE_{high}$ as well as the confidence range CR are altering during the test. For reasons of illustration, however, the three possibilities of the possible positions of the confidence range CR with respect to the constant $NE_{limit}$ are drawn for the same example in FIG. 3.

The above can be described by the following formulas:

The current number ns of time delays TD is calculated from the preliminary Error Ratio er and the preliminary number of bad time delays ne $$er = ne/ns \quad (6)$$

The specified ER expressed with number of time delays ns and number of bad time delays NE is $$ER_{limit} = NE_{limit}/ns \quad (7)$$

for abbreviation in the formula:

$$er_{norm} = er/ER_{limit} = ne/NE_{limit} \text{(normalised } er\text{)} \quad (8)$$

Early pass stipulates:

$$NE_{high} < NE_{limit} \quad (9)$$

Early fail stipulates:

$$NE_{low} > NE_{limit} \quad (10)$$

Formula for the early pass limit:

$$er_{norm} = \frac{ne}{NE_{high}} \quad (11)$$

This is the lower curve ($ernorm_{pass}$ (ne, C)) in FIG. 4, which shows $er_{norm}$ as a function of ne.

Formula for the early fail limit:

$$er_{norm} = \frac{ne}{NE_{low}}. \quad (12)$$

This is the upper curve ($ernorm_{fail}$ (ne, D)) in FIG. 4.

As the early pass limit is not defined for ne=0 (normally the case at the very beginning of the test for a good DUT), an artificial bad time delay event with the first measured time delay TD can be introduced. When the first real bad time delay event occurs, the artificial bad time delay is replaced by this real one. This gives the shortest possible measurement time for an ideal good DUT. For example ns=50 for $ER_{limit}$=0.1 and probability D=$D_1$=$D_2$=0.2%. (6 minutes 20 s)

As the early fail limit uses $NE_{low}$<1 for small ne<k (in the example below k=5) due to a decision problem at a fractional error, the early fail limit at ne=k is extended with a vertical line upwards. This ensures that a very bad DUT hits the early fail limit in any case after a few delays, approx. 10 in the example (1 minute 20 s). In other words, the test is not stopped as long as ne is smaller than k.

With each new time delay TD a new test is considered, reusing all former results. With each new test the preliminary data for ns, ne and er and $er_{norm}$ are updated and a $er_{norm}$/ne coordinate is entered into the $er_{norm}$-diagram. This is shown in FIG. 5. Once the trajectory crosses the early fail limit ($er_{norm}$ (ne,D)) or the early pass limit ($er_{norm}$ (ne,C)) the test may be stopped and the conclusion of early fail or early pass may be drawn based on this instant.

FIG. 5 shows the curves for early fail and early pass. $er_{norm}$ is shown as a function of the number of bad time delays ne. For the simple example demonstrated in FIG. 5, it is $ER_{limit}$=0.2=1/5 and the final Error Ratio ER=0.25 (1/4). The test starts with the first time delay TD, for which no error (bad time delay) is detected. For the second time delay TD, a first error (bad time delay) is detected and the preliminary Error Ratio er=ne/ns=1/2 and $er_{norm}$=er/$ER_{limit}$ becomes 1/2:1/5=5/2. $er_{norm}$ after the second time delay TD is marked with a cross a in FIG. 5. For the third, fourth and fifth time delay TD, no further error (bad time delay) occurs and $er_{norm}$ subsequently becomes 5/3, 5/4 and 5/5, respectively, which is marked with the crosses b, c and d in FIG. 5, respectively. The sixth time delay TD brings a new error (bad time delay) and ne becomes 2. Consequently, er=ne/ns becomes 2/6 and $er_{norm}$ becomes 10/6. This situation is marked with cross e in FIG. 5. For the seventh, eighth and ninth delay TD, no further error (bad time delay) occurs and the situation after the seventh, eighth and ninth delay TD is marked with crosses f, g, h in FIG. 5, respectively. The tenth time delay TD brings a third error (bad time delay). Consequently, er becomes 3/10 and $er_{norm}$ becomes 15/10. This situation is marked with cross i in FIG. 5. As can be seen from FIG. 5, the trajectory is between the early fail curve and the early pass curve at the beginning of the test, but converges to a line Z, which crosses the early fail curve after about forty errors. After forty errors, it can thus be decided that the tested DUT early fails the test.

The calculations above give optimal results in terms of test-time for small error ratios/high success ratios. If this is not the case, the approach with the Poisson distribution can be used nevertheless. For any error ratio/success ratio the binomial distribution is valid. The Poisson distribution is wider than the equivalent binomial distribution, hence the confidence range is wider, hence the space between the early pass and the early fail limit is wider, hence the result is not optimal in terms of test-time, but conservative is the following sense: the test-time is longer than optimal and the wrong decision risk is lower than predefined.

To get optimal results also for higher error ratios/lower success ratios the binomial distribution must be applied as follows:

The binomial distribution has the following form: dbinom (ne, ns, ER)

with ne: number of errors (bad time delays) detected, ns, number of time delays TD, measured, (ne/ns=preliminary error ratio er)

ER: the mean value of the distribution is the error ratio

The worst possible distribution with respect to a measured er=ne/ns is defined by the inverse cumulative operation:

$$D = \int_0^{ne} dbinom(ni, ns, ER_{high}) dni \quad (13)$$

with

D: wrong decision risk ni: integration variable ne: number of errors (bad time delays) currently detected, simultaneously integration limit ns: number of time delays TD, currently measured $ER_{high}$: The parameter to be tuned, to make the integral consistent. This is the wanted value.

The result has the form: $ER_{high}$=qbinom (C, ne, ns)

With C=1−D, the complementary wrong decision risk is equal to the confidence level.

The best possible distribution is defined by the inverse cumulative operation:

$$D = \int_{ne}^{ns} dbinom(ni, ns, ER_{low}) dni \quad (14)$$

with ne: number of errors (bad time delays) currently detected, simultaneously integration limit ns: number of time delays TD, currently measured, simultaneously integration limit $ER_{low}$: The parameter to be tuned, to make the integral consistent. This is the wanted value.

The result has the form: $ER_{low}$=qbinom (D,ne,ns)

Another inverse cumulative inversion, than the one above, is frequently offered with standard mathematical software tools. The form is similar: qbinom (D, at least one other parameters than above).

The confidence range is the range between $ER_{high}$ and $ER_{low}$. The normalized $er_{norm}$ is the measured (preliminary) er=ne/ns divided by $ER_{limit}$ Early pass stipulates:

$ER_{high} < ER_{limit}$

Early fail stipulates:

$ER_{low} > ER_{limit}$

In analogy to the Poisson approach, the early fail limit is $$er_{norm\,fail} = er/ER_{low} \quad (15)$$

The early pass limit is $$er_{norm\,pass} = er/ER_{high} \quad (16)$$

The following consideration is valid for both, the Poisson and the binomial approach:

If no early stop occurs the ER test may be stopped, after the following condition is valid:

$$ne >= K \quad (17)$$

and the DUT shall be passed, if ns is sufficiently high. K is a maximum number of errors (bad time delays). For example K can be 200.

If the trajectory neither crosses the early fail curve nor the early pass curve after K (for example 200) errors (bad time delays) have occurred, the DUT can be finally passed. If the DUT, however, is rather good or rather bad, the tests can be stopped much earlier, long before the K=200 errors (bad time delays) have occurred. This significantly shortens the total test time.

In the above embodiment early fail means: a DUT, which survived to certain preliminary ER stage, is failed and a probability of 0.2% that it is actually better than the ER-limit is accepted. Further early pass means: the DUT, which survived to certain preliminary ER stage, is passed and a probability of 0.2% that it is actually worse than the ER-limit is accepted. If the test is stopped at 200 errors (bad time delays) the DUT is passed without any early fail or early pass condition arbitrarily. It can cross the vertical 200 error line in FIG. 4 at different heights.

Each height is connected with a certain statistical interpretation: The probability to have a DUT better (worse) than the ER-limit is indicated in FIG. 7. The vertical in FIG. 7 shows the position in FIG. 4 at the end of the test. The horizontal line in FIG. 7 shows the respective probability. Hence such a test has different qualities, a better one at the early pass fail limits, and a worse and variable one at the unconditioned stop at 200 errors The following embodiment overcomes this drawback and additionally accelerates the test. This is done by a meaningful redefinition of the early pass limit maintaining the early fail limit. Early pass means now: A DUT, which survived to certain preliminary ER stage, is passed and a probability of 0.2% that it is actually worse than M times the specified ER-limit (M>1) is accepted. This is a bad DUT ER-limit. This shifts the early pass limit upwards in FIG. 4 as shown in FIG. 6. $er_{norm\,pass}$ (ne, C) in FIG. 4 becomes $er_{norm\,bad\,pass}$ (ne, C) in FIG. 6. $er_{norm\,fail}$ (ne, D) remains unchanged. Now it is $NE_{limit,M} = ER_{limit} \cdot M \cdot ns$ for Poisson $ER_{limit,M} = ER_{limit} \cdot M$ for Binomial and an early pass is allowed, if $$NE_{limit} \cdot M = NE_{limit,M} > NE_{high} \text{ (Poisson)}$$

$$ER_{limit} \cdot M = ER_{limit,M} > ER_{high} \text{ (binomial)} \quad (18)$$

There are three high level input parameters for the test:
Specified error limit e.g. 10%
Probability to make a wrong decision in the entire test (proposal: F=3%)
Definition of a bad DUT ($ER_{limit} \cdot M$)
From this the working parameters are derived:
D, the wrong decision risk for a single test step, is derived from F, the wrong decision risk for the entire test. The method to do this is described below.

With D the early pass and fail limits can be calculated according to formula 11, 12, 15, 16.

The intersection co-ordinates of the early pass and the early fail limit are the maximum number of errors (bad time delay) and the error ratio test limit TL (specified error limit<TL<M*specified error limit).

There are infinite possibilities to overcome the above mentioned drawback with different test qualities.

In the example above the open end between the pass fail-limits was originally declared pass, and time was saved by multiplying the early pass limit with M (M>1), shifting it upwards such that the early fail and the early pass curve intersect at 200 errors (200 bad time delays: example from above). Thus only a DUT, bad with high probability, is failed (customer risk).

The complementary method is: The open end between the early pass fail limits is declared fail, and time is saved by multiplying the early fail limit with m (0<m<1), shifting it downwards, such that the early fail and the early pass curve intersect at 200 errors (200 bad time delays: example from above). Thus only a DUT, good with high probability, is passed (manufacturer risk).

The compromise method is: The open end between the early pass fail limits is partitioned in any ratio: the upper part is declared fail and the lower part is declared pass. Time is saved by multiplying the early fail limit with m (0<m<1) and such shifting it downwards and by multiplying the early pass limit with M (M>1) and such shifting it upwards. So the early fail and the early pass curve intersect at 200 errors (200 bad time delays: example from above).

With given $D_1$ and $D_2$ the early fail curve and the early pass curves in FIG. 5 and FIG. 4 or FIG. 6 can be calculated before the test is started. During the test only $er_{norm}=ne/NE_{limit}$ (for binomial: $er_{norm}=er/ER_{limit}$) has to be calculated and to be compared with the early pass limit and the early fail limit as explained with respect to FIG. 5 and FIG. 6. Thus, no intensive calculation has to be done during the test.

$D_1$ and $D_2$ above describe the single step wrong decision probability for a DUT, which survived without early stop to a certain preliminary ER stage. For a real test it is desirable to define in advance a wrong decision probability F for the entire test. For every step a fraction of DUTs leave the statistical totality due to single step wrong decision probability D. This accumulates to an amount F>D.

It is proposed to derive D from F by the following method:

Based on statistical independence, a large ensemble of DUTs with ER on the ER-limit (limit-DUT) and with M*ER (bad DUT) is simulated and the entire test for the limit-DUT ensemble and the bad DUT ensemble is run by simulation against the early pass and early fail bound, with a free D-parameter ($D_1$ and $D_2$). The simulation will show, that a certain fraction F (D<F<1) of the large ensemble falsely fails (limit-DUT) or falsely passes (bad DUT). This represents the wrong decision probability F for the entire test. D is tuned such that F corresponds to the predefined wrong decision probability.

The initially mentioned wrong decision risk 3% corresponds, as a result of the simulation, the single step wrong decision risk of 0.2% applied in the formulas and figures.

In retrospect the distributions are not any more exact applying this simulation: Once a DUT leaves the statistical totality due to early fail or early pass, the subsequent distribution is changed. In so far the initially selected distribution has its intended validity only at the beginning of the test. Due to early passes and early fails the distribution is truncated more and more towards the end of the test. These truncated distributions cannot be handled anymore analytically, and so it is impossible to derive D from F analytically. It is possible to derive each subsequent distribution by numerical methods. Then it is possible to derive D from F numerically. In the above proposed process, just a unique, the initial distribution is applied as approximation instead of a set of correct distributions. With a set of correct distributions it is possible to calculate D from F by:

$$F=1-(1-D)^{ne} \quad (19)$$

Generally it can be assumed:

$$F>D\geq 1-(1-F)^{1/ne} \quad (20)$$

This formula can serve as an infimum for D, if the method is based on simulation using the initial distribution.

The invention claimed is:

1. A method for testing a time delay error ratio ER of a device against a maximal allowable time delay error ratio $ER_{limit}$ with an early pass criterion, whereby the early pass criterion is allowed to be wrong only by a first probability $D_1$, comprising the following steps:
 measuring ns time delays (TD) of the device, thereby detecting ne bad time delays, which exceed a certain time limit, of these us time delays (TD),
 estimating a likelihood distribution giving a distribution of a number ni of bad time delays in a fixed number of samples of time delays (TD) as PD(ni, NE), wherein NE is the average number of bad time delays,
 obtaining $PD_{high}$ from $$D_1 = \int_0^{ne} PD_{high}(ni, NE_{high}) \, dni,$$

wherein $PD_{high}$ is the worst possible likelihood distribution containing the measured ne bad time delays with the probability $D_1$,
 obtaining the average number $NE_{high}$ of bad time delays for the worst possible likelihood distribution $PD_{high}$,
 comparing $NE_{high}$ with $NE_{limit}=ER_{limit} \cdot ns$,
 if $NE_{limit}$ is higher than $NE_{high}$ stopping the test and deciding that the device has early passed the test and
 if $NE_{limit}$ is smaller than $NE_{high}$ continuing the test whereby increasing ns.

2. A method according to claim 1, wherein the likelihood distribution $PD_{high}$ (ni, NE) is a Poisson distribution.

3. A method according to claim 1, wherein the likelihood distribution $PD_{high}$ (ni, NE) is a binomial distribution.

4. A method according to claim 1, wherein, for avoiding an undefined situation for ne=0 starting the test with an artificial bad time delay ne=1, not incrementing ne when a first error occurs.

5. A computer readable medium having stored thereon program code for causing a programmable computer or digital signal processor to perform the method of claim 1.

6. A machine readable data carrier having stored thereon program code for causing a programmable computer or digital signal processor to perform the method of claim 1.

7. A method for testing a time delay error ratio ER of a device against a maximal allowable time delay error ratio $ER_{limit}$ with an early pass criterion, whereby the early pass criterion is allowed to be wrong only by a first probability $F_1$ for the entire test, comprising the following steps:

measuring ns time delays (TD) of the device, thereby detecting ne bad time delays, which exceed a certain time limit, of these ns time delays (TD), estimating a likelihood distribution giving a distribution of a number ni of bad time delays in a fixed number of samples of time delays (TD) as PD(ni, NE), wherein NE is the average number of bad time delays, obtaining $PD_{high}$ from $$D_1 = \int_0^{ne} PD_{high}(ni, NE_{high}) \, dni,$$

wherein $PD_{high}$ is the worst possible likelihood distribution containing the measured ne bad time delays with a single step wrong decision probability $D_1$ for a preliminary error ratio ER stage, whereby using a single step wrong decision probability $D_1$ smaller than the probability $F_1$ for the entire test, obtaining the average number of $NE_{high}$ of bad time delays for the worst possible likelihood distribution $PD_{high}$, comparing $NE_{high}$ with $NE_{limit} = ER_{limit} \cdot ns$, if $NE_{limit}$ is higher than $NE_{high}$ stopping the test and deciding that the device has early passed the test and if $NE_{limit}$ is smaller than $NE_{high}$ continuing the test whereby increasing ns.

8. A method according to claim 7 wherein the single step wrong decision probability $D_1$ is in the range of $F_1 > D_1 \geq 1 - (1-F_1)^{1/ne}$.

9. A method for testing a time delay error ratio ER of a device against a maximal allowable time delay error ratio $ER_{limit}$ with an early fail criterion, whereby the early fail criterion is allowed to be wrong only by a first probability $D_2$, comprising the following steps:

measuring ns time delays (TD) of the device, thereby detecting ne bad time delays, which exceed a certain time limit, of these ns time delays (TD), estimating a likelihood distribution giving a distribution of a number ni of bad time delays in a fixed number of samples of time delays (TD) as PD(ni, NE), wherein NE is the average number of bad time delays, obtaining $PD_{low}$ from $$D_2 = \int_0^{ne} PD_{low}(ni, NE_{low}) \, dni,$$

wherein $PD_{low}$ is the best possible likelihood distribution containing the measured ne bad time delays with the probability $D_2$, obtaining the average number $NE_{low}$ of bad time delays for the best possible likelihood distribution $PD_{low}$, comparing $NE_{low}$ with $NE_{limit} = ER_{limit} \cdot ns$, if $NE_{limit}$ is smaller than $NE_{low}$ stopping the test and deciding that the device has early passed the test and if $NE_{limit}$ is higher than $NE_{low}$ continuing the test whereby increasing ns.

10. A method according to claim 9, wherein the likelihood distribution $PD_{low}$ (ni, NE) is a Poisson distribution.

11. A method according to claim 9, wherein the likelihood distribution $PD_{low}$ (ni, NE) is a binomial distribution.

12. A method according to claim 9, wherein for avoiding a undefined situation for ne<k, wherein k is a number of bad time delays, not stopping the test as long as ne is smaller than k.

13. A method according to claim 9, characterized by an additional early pass criterion, whereby the early pass criterion is allowed to be wrong only by a first probability $D_1$, further comprising:

estimating a likelihood distribution giving a distribution of a number of bad time delays ni in a fixed number of samples of time delays (TD) as PD(ni, NE), wherein NE is the average number of bad time delays, obtaining $PD_{high}$ from $$D_1 = \int_0^{ne} PD_{high}(ni, NE_{high}) \, dni,$$

wherein $PD_{high}$ is the worst possible likelihood distribution containing the measured ne bad time delays with the probability $D_1$, obtaining the average number $NE_{high}$ of bad time delays for the worst possible likelihood distribution $PD_{high}$, comparing $NE_{high}$ with $NE_{limit} = ER_{limit} \cdot ns$, if $NE_{limit}$ is higher than $NE_{high}$ stopping the test and deciding that the device has early passed the test and if $NE_{limit}$ is smaller than $NE_{high}$ continuing the test, whereby increasing ns.

14. A method according to claim 13, wherein the probability $D_1$ for the wrong early pass criterion and the probability $D_2$ for the wrong early fail criterion are equal ($D_1 = D_2$).

15. A method according to claim 9, characterized by an additional early pass criterion, whereby the early pass criterion is allowed to be wrong only by first probability $D_1$, further comprising:

estimating a likelihood distribution giving a distribution of the number of bad time delays ni in a fixed number of samples of time delays (TD) is PD(ni, NE), wherein NE is the average number of bad time delays, obtaining $PD_{high}$ from $$D_1 = \int_0^{ne} PD_{high}(ni, NE_{high}) \, dni,$$

wherein $PD_{high}$ is the worst possible likelihood distribution containing the measured ne bad time delays with the probability $D_1$, obtaining the average number $NE_{high}$ of bad time delays for the worst possible likelihood distribution $PD_{high}$, comparing $NE_{high}$ with $NE_{limit,M} = ER_{limit} \cdot M \cdot ns$, where M is a variable with M>1, if $NE_{limit,M}$ is higher than $NE_{high}$ stopping the test and deciding that the device has early passed the test and if $NE_{limit,M}$ is smaller than $NE_{high}$ continuing the test, whereby increasing ns.

16. A method according to claim 9, characterized by an additional early pass criterion, whereby the early pass criterion is allowed to be wrong only by a first probability $F_1$ for the entire test, further comprising:

estimating a likelihood distribution giving a distribution of the number of bad time delays ni in a fixed number of samples of time delays (TD) as PD(ni, NE), wherein NE is the average number of bad time delays, obtaining $PD_{high}$ from $$D_1 = \int_0^{ne} PD_{high}(ni, NE_{high}) dni$$

wherein $PD_{high}$ is the worst possible likelihood distribution containing the measured ne bad time delays with a single step wrong decision probability $D_1$ for a preliminary error ratio ER stage, whereby using a single step wrong decision probability $D_1$ smaller than the probability $F_1$ for the entire test, obtaining the average number of $NE_{high}$ of bad time delays for the worst possible likelihood distribution $PD_{high}$, comparing $NE_{high}$ with $NE_{limit}=ER_{limit} \cdot ns$, if $NE_{limit}$ is higher than $NE_{high}$ stopping the test and deciding that the device has early passed the test and if $NE_{limit}$ is smaller than $NE_{high}$ continuing the test, whereby increasing ns.

17. A method according to claim 16, wherein the probability $F_1$ for the wrong early pass criterion and the probability $F_2$ for the wrong early fail criterion are equal ($F_1=F_2$).

18. A method according to claim 9, characterized by an additional early pass criterion, whereby the early pass criterion is allowed to be wrong only by a first probability $F_1$ for the entire test, further comprising:

estimating a likelihood distribution giving a distribution of the number of bad time delays ni in a fixed number of samples of time delays (TD) is PD(ni, NE), wherein NE is the average number of bad time delays, obtaining $PD_{high}$ from $$D_1 = \int_0^{ne} PD_{high}(ni, NE_{high}) dni,$$

wherein $PD_{high}$ is the worst possible likelihood distribution containing the measured ne bad time delays with a single step wrong decision probability $D_1$ for a preliminary error ratio ER stage, whereby using a single step wrong decision probability $D_1$ smaller than the probability $F_1$ for the entire test, obtaining the average number $NE_{high}$ of bad time delays for the worst possible likelihood distribution $PD_{high}$, comparing $NE_{high}$ with $NE_{limit,M}=ER_{limit} \cdot M \cdot ns$, where M is a variable with M>1, if $NE_{limit,M}$ is higher than $NE_{high}$ stopping the test and deciding that the device has early passed the test and if $NE_{limit,M}$ is smaller than $NE_{high}$ continuing the test, whereby increasing ns.

19. A method according to claim 9, wherein for avoiding a undefined situation for ne=0 starting the test with an artificial bad time delay ne=1 not incrementing ne when a first error occurs.

20. A computer readable medium having stored thereon program code for causing a programmable computer or digital signal processor to perform the method of claim 9.

21. A machine readable data carrier having stored thereon program code for causing a programmable computer or digital signal processor to perform the method of claim 9.

22. A method for testing a time delay error ratio ER of a device against a maximal allowable time delay error ratio $ER_{limit}$ with an early fail criterion, whereby the early fail criterion is allowed to be wrong only by a first probability $F_2$ for the entire test, comprising the following steps:

measuring ns time delays (TD) of the device, thereby detecting ne bad time delays, which exceed a certain time limit, of these ns time delays (TD), estimating likelihood distribution giving a distribution of a number ni of bad time delays in a fixed number of samples of time delays (TD) as PD(ni, NE), wherein NE is the average number of bad time delays, obtaining $PD_{low}$ from $$D_2 = \int_{ne}^{\infty} PD_{low}(ni, NE_{low}) dni,$$

wherein $PD_{low}$ is the best possible likelihood distribution containing the measured ne bad time delays with a single step wrong decision probability $D_2$ for a preliminary error ratio ER stage, whereby using a single step wrong decision probability $D_2$ smaller than the probability $F_2$ for the entire test, obtaining the average number of $NE_{low}$ of bad time delays for the best possible likelihood distribution $PD_{low}$, comparing $NE_{low}$ with $NE_{limit}=ER_{limit} \cdot ns$, if $NE_{limit}$ is smaller than $NE_{low}$ stopping the test and deciding that the device has early passed the test and if $NE_{limit}$ is higher than $NE_{low}$ continuing the test whereby increasing ns.

23. A method according to claim 22, wherein the single step wrong decision probability $D_2$ is in the range of $F_2 > D_2 \geq 1-(1-F_2)^{1/ne}$.

* * * * *